United States Patent [19]
Weber

[11] Patent Number: 4,747,032
[45] Date of Patent: May 24, 1988

[54] AIR-VENT HEADLIGHT FOR MOTOR VEHICLES

[75] Inventor: Walter Weber, Reisensburg, Fed. Rep. of Germany

[73] Assignee: Robert Bosch GmbH, Stuttgart, Fed. Rep. of Germany

[21] Appl. No.: 24,375

[22] Filed: Mar. 10, 1987

[30] Foreign Application Priority Data

May 9, 1986 [DE] Fed. Rep. of Germany ....... 3615576

[51] Int. Cl.$^4$ ............................................... F21V 29/00
[52] U.S. Cl. ..................................... 362/294; 362/345
[58] Field of Search .................... 362/294, 345, 74, 61

[56] References Cited

U.S. PATENT DOCUMENTS

| | | | |
|---|---|---|---|
| 3,325,637 | 6/1967 | Honda | 362/345 |
| 3,859,516 | 1/1975 | Tuzson | 362/71 |
| 4,249,232 | 2/1981 | Dick | 362/294 |
| 4,569,007 | 2/1986 | Dick | 362/294 |
| 4,635,173 | 1/1987 | Dressler et al. | 362/373 |

FOREIGN PATENT DOCUMENTS

| | | | |
|---|---|---|---|
| 2755200 | 6/1979 | Fed. Rep. of Germany | 362/345 |
| 2308862 | 12/1976 | France | 362/294 |
| 2069120 | 8/1981 | United Kingdom | 362/294 |

Primary Examiner—Charles J. Myhre
Assistant Examiner—David A. Okonsky
Attorney, Agent, or Firm—Michael J. Striker

[57] ABSTRACT

An air-vent headlight includes an air outlet device formed of plastic and provided on the underside of the inner reflector and an air inlet device, also of plastic, and arranged on the upper side of the outer reflector. The air outlet device has a horizontal outlet tube the front side of which is inclined towards the center of the headlight. The air inlet device has an inlet tube extending opposite to the direction of travel of the vehicle.

10 Claims, 2 Drawing Sheets

4,747,032

AIR-VENT HEADLIGHT FOR MOTOR VEHICLES

BACKGROUND OF THE INVENTION

The present invention relates to an air-vent headlight for motor vehicles.

Headlights of the type under discussion include a structural unit formed by a reflector, an incandescent lamp and a lens, and which unit in turn forms an inner chamber closed from the atmosphere. In such headlights air exchange, that is air venting of the inner chamber, is produced by suction at an outlet arrangement on the upper side of the reflector. The outlet arrangement is formed as a flue with a bypass. This flue is relatively large in volume and requires the mounting at the side of the headlight.

SUMMARY OF THE INVENTION

It is an object of the present invention to provide an improved air-vent headlight for motor vehicles.

It is another object of the present invention to provide an improved air-vent headlight for motor vehicles.

It is another object of the invention to provide an air-vent headlight which has an air inlet device of a very simple structure and which requires a very little space.

In contrast to conventional air-vent headlights, with the headlight according to the invention, the air stream causing the air exchange flows counter to a thermal blow inside the inner chamber of the aforementioned structural unit.

The objects of the invention are attained by an air-vent headlight for motor vehicles, comprising a structural unit formed by a reflector, an incandescent lamp and a lens, said structural unit having an inner space closed from the atmosphere; an air inlet arrangement and an air outlet arrangement both provided on said unit for air exchange in said inner space, particularly during the travel of a vehicle, said outlet arrangement having an outlet tube which is positioned approximately transversely to the direction of travel of the vehicle, said outlet tube having a front side which is inclined so that vacuum occurs in said outlet tube during the travel of the vehicle, said inlet arrangement having an inlet tube extending towards the direction of travel of the vehicle.

The inclination of said front side may be such that one edge of said outlet tube is longer than another edge which lies diametrically opposite to said one edge, said outlet tube having an axis and a slot formed in the region of said longer edge and extending parallel to said axis.

The headlight has a vertical central plane and a horizontal central plane, the vehicle having a vertical elongated central plane; the outlet arrangement may be positioned in a half of the reflector facing said vertical elongated central plane, said front side of said outlet tube extending towards said vertical central plane, said inlet tube having an oval cross-section and horizontally extending longitudinal sides, said inlet tube being substantially parallel to said horizontal central plane and having an end portion which opens towards said horizontal central plane.

If two reflectors are provided which are positioned one next to another, and each reflector has a flat underside and a flat upper side, said outlet arrangement may be located on the flat underside of the reflector which is inner as referred to a central elongated axis of the vehicle whereas said inlet arrangement is located on the flat upper side of the reflector which is outer as referred to the central elongated axis of the vehicle.

The underside of said inner reflector may have a first opening and the upper side of said upper reflector may have a second opening, said inlet arrangement having a tubular connection being in communication with said inlet tube, said outlet arrangement having a tubular connection being in communication with said outlet tube, each tubular connection being in correlation with a respective one of said openings and providing a hermetical connection with the inner space of said structural unit.

Each arrangement may be made of plastic.

Each tube connection may have a plurality of hooks which engage at least the underside and upper side receiving a respective arrangement in the region of a respective opening.

The outlet arrangement may further include a plate receiving said tubular connection, said underside having a coulisse, said plate being insertable into said coulisse and fastened in a functional position.

The coulisse and the plate may be conically tapered in a direction of insertion of said plate, said underside having a flange, said coulisse being positioned on said flange, said outlet arrangement being fastened to said flange by means of at least one bolt.

The structural unit may be adjustable, particularly in a vertical direction and include an adjustment bolt for adjusting said structural unit, said adjustment bolt being axially secured and having an end piece pivotable in said structured unit, said end piece being spherical and being connected to said outlet device.

Said end piece may be a ball-shaped pin, said outlet device having a spherical bearing shell with two diametrically opposing support elements which secure said pin in said bearing shell.

In the headlight of this invention an air exchange in the inner space of the structural unit is provided in which moisture content does not exceed the limits required in the U.S.A.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
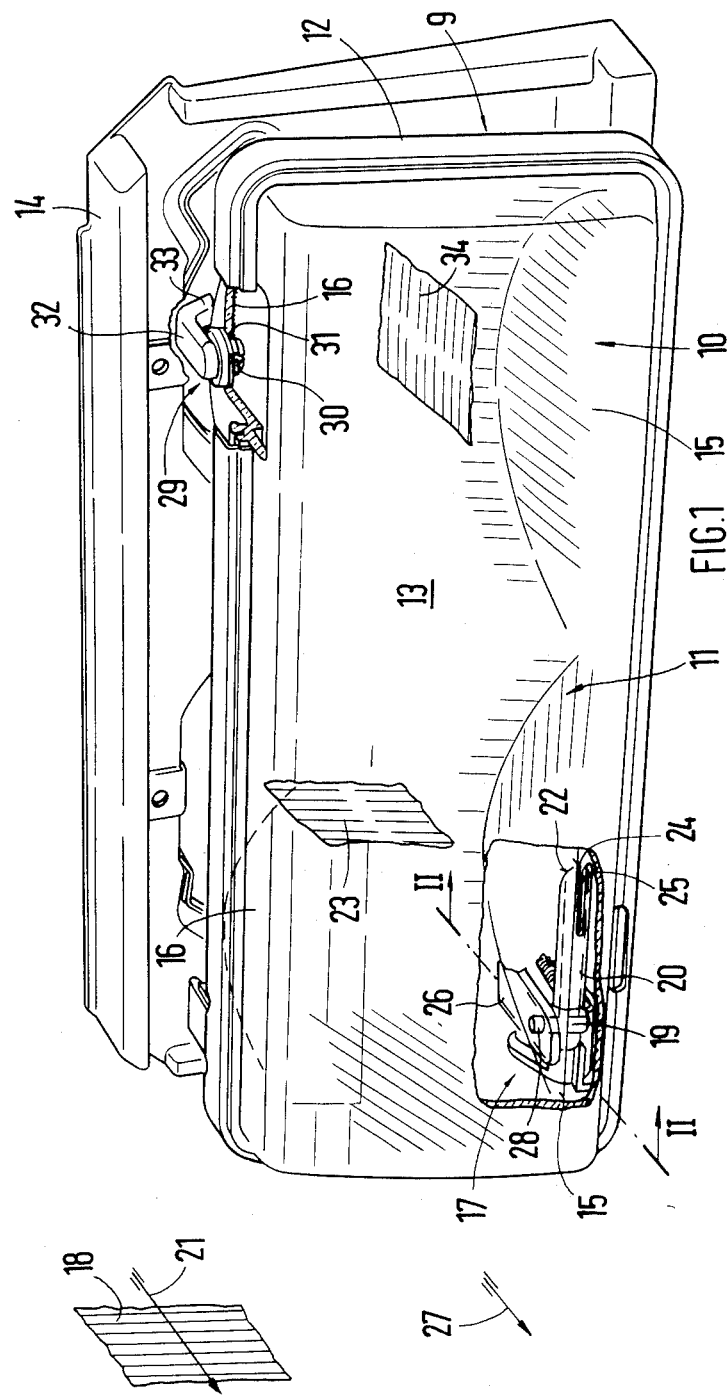
FIG. 1 is a perspective view of the left-side headlight for a personal car, with cut-out sections showing an inlet arrangement and an outlet arrangement, on decreased scale.

A left-side headlight for a personal car shown in FIG. 1 has a unit 9 which includes two reflectors 10, 11 made of one-piece, a non-shown incandescent lamp and a lens 12. The unit 9 forms an inner chamber 13 substantially closed from the atmosphere. The unit 9 is adjustably supported in a non-shown but any suitable conventional fashion on a holding frame 14. The latter is screwed to the body of the car.

Each reflector 10, 11 is formed as a so-called rectangular reflector with a flat underside 15 and a flat upper side 16 so that both reflectors 10, 11 are positioned one after the other.

An air outlet arrangement 17 made of plastic is provided at the half of the reflector 11, which faces a vertical elongated central plane 18 of the car. The air outlet arrangement 17 is connected to a tubular connection 19 which is in communication with an outlet tube 20 which is positioned approximately transversely to the direction of travel 21 of the car. A front side 22 of the outlet tube 20 is inclined to the vertical central plane 23 of the reflector 11 such that the edge 24 of tube 20 is longer in the direction of travel 21 than its diametrically opposing edge whereby a slot 25 parallel to the axis of the outlet tube 20 is formed in the region of the longer edge 24. Vacuum occurs within the outlet arrangement 17 during the travel of the car.

The air outlet arrangement 17 further has a plate 26 provided with the tubular connection 19. Plate 26 is insertable in and fastenable in a coulisse of the underside 15 of the inner reflector 11. Thereby the coulisse and plate 26 are conically tapered in the direction of insertion according to arrow 27, and the tubular connection 19 has, via an opening 28 in the underside 15 of reflector 11, a hermetical connection with the inner chamber 13.

An air inlet arrangement 29, also made of plastic, has a tubular connection 30 which is locked in an opening 31 of the upper side 16 of reflector 10. An air inlet tube 32 which is of oval cross-section is in communication with the tubular connection 30. The elongated sides of tube 32 are horizontal. The inlet tube 32 is initially parallel to the horizontal central plane 34 of reflector 10 and the end portion 33 of this tube opens towards the horizontal central plane 34.

Figure 2:
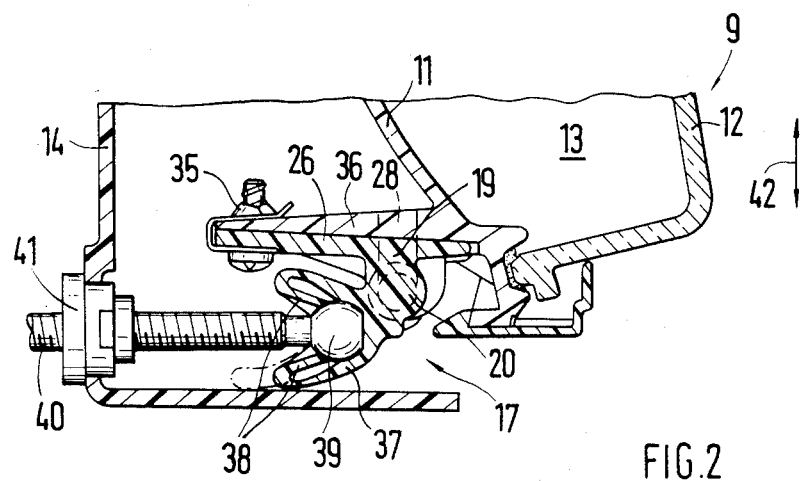
FIG. 2 is a sectional view taken on line II—II of FIG. 1 and showing a first embodiment of the air outlet arrangement, on natural scale.

The plate 26 of the outlet arrangement as shown in FIG. 2 is secured by means of a bolt 35 to a flange 36 provided on the underside of the inner reflector 11. The air outlet arrangement further has a spherical bearing shell 37 made of one piece with two diametrically opposing supporting elements 38 for securing therebetween of a ball-shaped pin 39. The latter is formed as an end piece of an adjustment bolt 40 which cooperates with a nut 44 connected to the frame 14. The headlight, namely its its unit 9 is pivotable by means of the adjustment bolt 40 about a non-shown rigid pivot point and is adjustable in the vertical direction according to double arrow 42.

Figure 3:
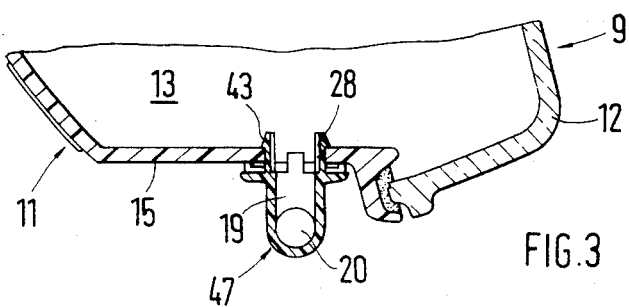
FIG. 3 is a vertical section through a second embodiment of the outlet arrangement, on natural scale.

The second embodiment of the air outlet arrangement 47 shown in FIG. 3 has a plurality of resilient or elastic hooks 43 formed on the tubular connection 19. Hooks 43 engage with the underside 15 of reflector 11, in the region of opening 28 whereby the air outlet arrangement 47 is releasably-secured at the unit 9.

During the travel of the car, vacuum occurs in the outlet tube 20, this vacuum causes an outflow of the air from the inner chamber 13 and the inflow of the external air via the air inlet arrangement 29; therefore fog formation on the inner side of the reflectors 10, 11 and lens 12 is prevented.

It will be understood that each of the elements described above, or two or more together, may also find a useful application in other types of air-vent headlight for motor vehicles differing from the types described above.

While the invention has been illustrated and described as embodied in an air-vent headlight for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An air-vent headlight for motor vehicles, comprising a structural unit formed by a reflector, an incandescent lamp and a lens, said structural unit having an inner space closed from the atmosphere; an air inlet arrangement and an air outlet arrangement both provided on said unit for air exchange in said inner space, particularly during the travel of a vehicle, said outlet arrangement having an outlet tube which is positioned approximately transversely to the direction of travel of the vehicle, said outlet tube having a front side which is inclined so that vacuum occurs in said outlet tube during the travel of the vehicle, said inlet arrangement having an inlet tube extending towards the direction of travel of the vehicle, an inclination of said front side being such that one edge (24) of said outlet tube is longer than another edge which lies diametricallly opposite to said one edge, said outlet tube having an axis and a slot formed in the region of said longer edge and extending parallel to said axis.

2. The headlight as defined in claim 1, wherein the headlight has a vertical central plane (23) and a horizontal central plane (34), the vehicle having a vertical elongated central plane (18), said outlet arrangement being positioned in a half of the reflector facing said vertical elongated central plane (18), said front side (22) of said outlet tube extending towards said vertical central plane (23), said inlet tube having an oval cross-section and horizontally extending longitudinal sides, said inlet tube being substantially parallel to said horizontal central plane (34) and having an end portion (33) which opens towards said horizontal central plane (34).

3. The headlight as defined in claim 2, wherein two reflectors are provided which are positioned one next to another, each reflector having a flat underside and a flat upper side, said outlet arrangement (17) being located on the flat underside of the reflector (11) which is inner as referred to a central elongated axis of the vehicle whereas said inlet arrangement (29) is located on the flat upper side of the reflector (10) which is outer as referred to the central elongated axis of the vehicle.

4. The headlight as defined in claim 3, wherein the underside of said inner reflector has a first opening (28) and the upper side of said upper reflector has a second opening (31), said inlet arrangement having a tubular connection (30) being in communication with said inlet tube, said outlet arrangement having a tubular connection (19) being in communication with said outlet tube (20), each tubular connection being in correlation with a respective one of said openings and providing a hermetical connection with the inner space of said structural unit.

5. The headlight as defined in claim 4, wherein said inlet and outlet arrangement is each formed of plastic.

6. The headlight as defined in claim 5, each tube connection (19, 30) having a plurality of hooks (43) which engage at least the underside and upper side (15, 16) receiving a respective arrangement in the region of a respective opening (28, 31).

7. The headlight as defined in claim 5, said outlet arrangement further including a plate (26) receiving said tubular connection (19), said underside (15) having a coulisse, said plate being insertable into said coulisse and fastened in a functional position.

8. The headlight as defined in claim 7, wherein said coulisse and said plate (26) are conically tapered in a direction of insertion (27) of said plate, said underside having a flange (36), said coulisse being positioned on said flange, said outlet arrangement being fastened to said flange by means of at least one bolt (35).

9. The headlight as defined in claim 8, wherein said structural unit is adjustable, particularly in a vertical direction, and including an adjustment bolt for adjusting said structural unit, said adjustment bolt being axially secured and having an end piece pivotable in said structural unit, said end piece (39) being spherical and being connected to said outlet device.

10. The headlight as defined in claim 9, wherein said end piece is a ball-shaped pin, said outlet device having a spherical bearing shell (37) with two diametrically opposing support elements (38) which secure said pin in said bearing shell.

* * * * *